US011403773B2

(12) United States Patent
Zaid et al.

(10) Patent No.: US 11,403,773 B2
(45) Date of Patent: Aug. 2, 2022

(54) METHOD OF STITCHING IMAGES CAPTURED BY A VEHICLE, AND A SYSTEM THEREOF

(71) Applicant: Wipro Limited, Bangalore (IN)

(72) Inventors: Mohd Zaid, New Delhi (IN); Amrit Paul, Hyderabad (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 16/914,529

(22) Filed: Jun. 29, 2020

(65) Prior Publication Data

US 2021/0304424 A1    Sep. 30, 2021

(30) Foreign Application Priority Data

Mar. 28, 2020   (IN) .............................. 202041013697

(51) Int. Cl.
*G06T 7/33*    (2017.01)
*H04N 5/232*   (2006.01)
*G06T 7/11*    (2017.01)

(52) U.S. Cl.
CPC ................ *G06T 7/337* (2017.01); *G06T 7/11* (2017.01); *H04N 5/23299* (2018.08); *G06T 2207/20076* (2013.01); *G06T 2207/20084* (2013.01); *G06T 2207/30252* (2013.01)

(58) Field of Classification Search
None
See application file for complete search history.

(56) References Cited

U.S. PATENT DOCUMENTS

| | | | |
|---|---|---|---|
| 8,294,748 B2* | 10/2012 | Stec ...................... | G06T 3/4038 382/284 |
| 10,769,430 B2* | 9/2020 | Kumar .................. | G06F 40/186 |
| 10,955,858 B2* | 3/2021 | Dev ....................... | G08G 1/166 |
| 2008/0266408 A1* | 10/2008 | Kim ...................... | H04N 1/3876 348/E5.024 |
| 2013/0064451 A1* | 3/2013 | Senda ...................... | G06T 7/30 382/190 |
| 2017/0180680 A1* | 6/2017 | Yu ....................... | H04N 5/23206 |
| 2018/0224855 A1* | 8/2018 | Eickhoff ................ | G01C 11/02 |
| 2019/0248290 A1* | 8/2019 | Turk ........................ | B60R 1/00 |
| 2019/0325580 A1 | 10/2019 | Lukac et al. | |
| 2020/0005489 A1* | 1/2020 | Kroeger ................. | G06V 10/44 |
| 2020/0225673 A1* | 7/2020 | Ebrahimi Afrouzi ...................... G05D 1/0016 | |
| 2021/0026355 A1* | 1/2021 | Chen ...................... | G06V 10/82 |

(Continued)

*Primary Examiner* — Tyler W. Sullivan
(74) *Attorney, Agent, or Firm* — Finnegan, Henderson, Farabow, Garret & Dunner, LLP

(57) ABSTRACT

The present disclosure relates to a method of stitching images captured by a vehicle. A first image and a second image are received. The first image and the second image are segmented based on characteristics of pixels. Groups of pixels having similar characteristics are identified to form clusters in a predetermined portion of overlap of the first image and the second image. A confidence score is generated for the first image and the second image. A difference in the confidence score is computed. At least one of, the first image capturing unit and the second image capturing unit is aligned to capture at least one of, a first aligned image and a second aligned image based on the difference in the confidence score. The first aligned image and the second aligned image are stitched.

15 Claims, 7 Drawing Sheets

(56) References Cited

U.S. PATENT DOCUMENTS

| | | | |
|---|---|---|---|
| 2021/0089040 A1* | 3/2021 | Ebrahimi Afrouzi | ........................ A47L 9/2894 |
| 2021/0090269 A1* | 3/2021 | Troy | ................... G01S 15/8945 |

* cited by examiner

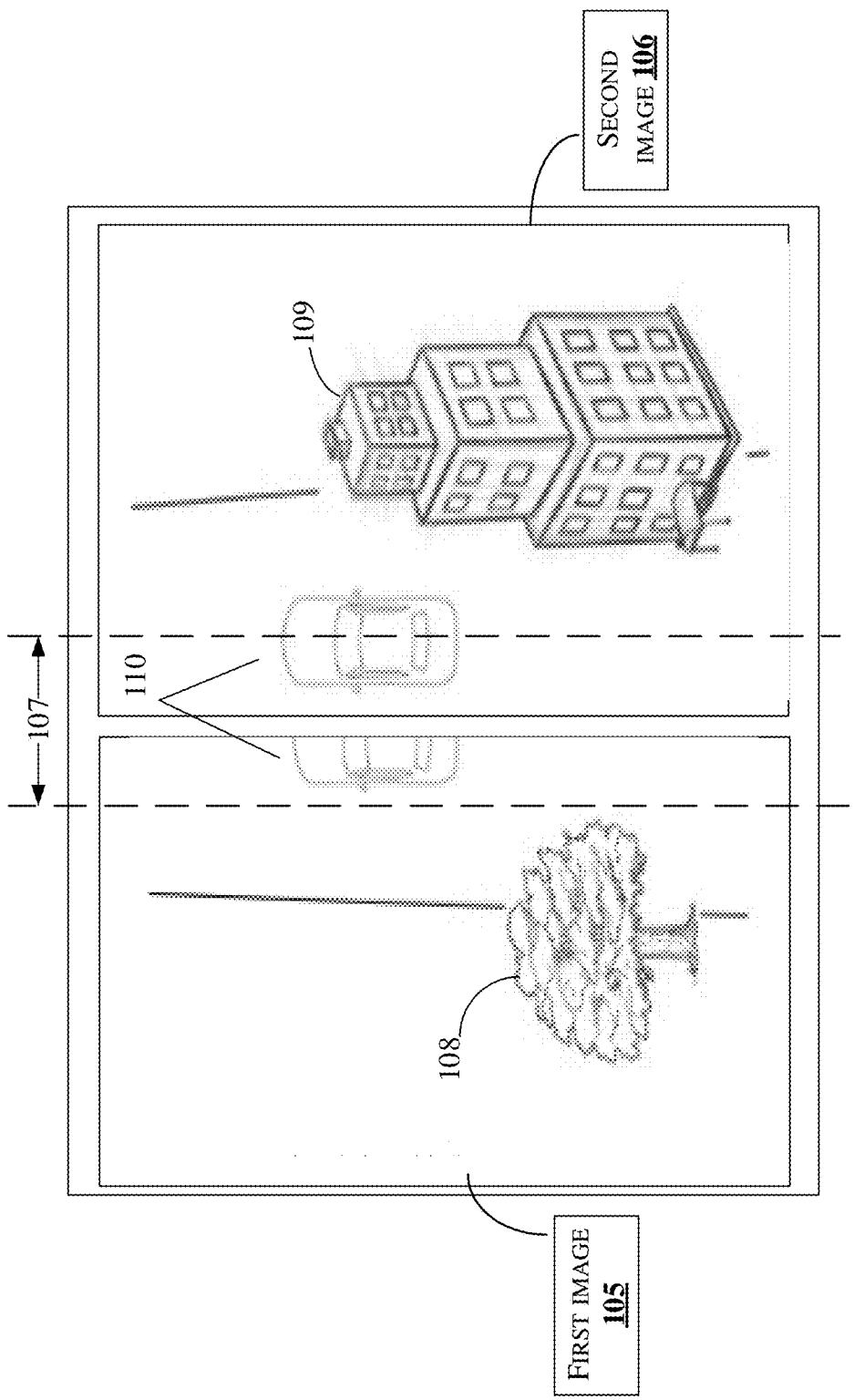

METHOD OF STITCHING IMAGES CAPTURED BY A VEHICLE, AND A SYSTEM THEREOF

TECHNICAL FIELD

The present disclosure relates to image processing. More particularly, the present disclosure relates to a method and a system for stitching images captured by a vehicle.

BACKGROUND

Current generation vehicles are driven autonomously, and autonomous vehicles need a 360° field of view to detect objects in various directions. The 360° field of view helps to prevent accidents, easy parking and ensures trouble-free driving. Typically, a plurality of sensors placed on autonomous vehicle captures images individually and the images captured are stitched together to produce an image providing the 360° view around the autonomous vehicle. Stitching of images is a process of combining multiple disconnected captured images with overlapping fields of view to produce a panoramic image. The panoramic image provides the 360° field of view.

Traditional techniques for stitching the images uses high overlapping fields of view. The high overlapping fields of view is used to recognise the disconnected images to form a single 360° image. Typically, three cameras are provided on each side of the vehicle to capture a field of view of 180°. The three cameras are provided on each side, such that an effective field of view of the three cameras capture the field of view of 180°. However, in the traditional approach, as the amount of overlap required is high to stitch the images captured by the three cameras, the field of view of each of the three cameras also overlap to a great extent. Hence, a greater number of cameras are required to capture the field of view of 180°. For example, in traditional systems, a total of 12 cameras are used to capture 360° view. As autonomous vehicles run on batteries, the amount of hardware has to be reduced to consume less power. Hence there is a need to provide a solution having less hardware and captures the 360° field of view around the autonomous vehicle. The high overlapping fields of view increases the processing of image data The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure discloses a method of stitching images captured by a vehicle. The method comprises receiving, by an Electronic Control Unit (ECU) of the vehicle, a first image comprising a first portion of a scene, from a first image capturing unit installed in the vehicle and a second image comprising a second portion of the scene, from a second image capturing unit installed in the vehicle. Further, the method comprises segmenting, by the ECU, the first image and the second image based on one or more characteristics of a plurality of pixels of the first image and the second image. Further, the method comprises identifying, by the ECU, one or more groups of pixels from the plurality of pixels in each of the first image and the second image having similar characteristics from the one or more characteristics. The identified one or more groups of pixels form one or more clusters and a centroid is determined for each of the one or more clusters in a predetermined portion of overlap. Further, the method comprises, generating, by the ECU, a confidence score for the first image and the second image based on the centroid of each of the one or more clusters. Furthermore, the method comprises computing, by the ECU, a difference in the confidence score of the first image and the second image. Moreover, the method comprises aligning, by the ECU, at least one of, the first image capturing unit and the second image capturing unit based on the difference in the confidence score. At least one of, the aligned first image capturing unit and the aligned second image capturing unit captures at least one of, a first aligned image and a second aligned image respectively. Thereafter, the method comprises stitching, by the ECU, the first aligned image and the second aligned image.

In an embodiment, the present disclosure discloses an Electronic Control Unit (ECU) for stitching images captured by a vehicle. The ECU comprises a processor and a memory. The processor is configured to receive a first image comprising a first portion of a scene, from a first image capturing unit installed in the vehicle and a second image comprising a second portion of the scene, from a second image capturing unit installed in the vehicle. Further, the processor is configured to segment the first image and the second image based on one or more characteristics of a plurality of pixels of the first image and the second image. Further, the processor is configured to identify one or more groups of pixels from the plurality of pixels in each of the first image and the second image having similar characteristics from the one or more characteristic. The identified one or more groups of pixels form one or more clusters, wherein a centroid is determined for each of the one or more clusters a predetermined portion of overlap. Further, the processor is configured to generate a confidence score for the first image and the second image based on the centroid of each of the one or more clusters. Furthermore, the processor is configured to compute a difference in the confidence score of the first image and the second image. Moreover, the processor is configured to align the first image capturing unit and the second image capturing unit based on the difference in the confidence score. At least one of, the aligned first image capturing unit and the aligned second image capturing unit captures at least one of, a first aligned image and a second aligned image respectively. Thereafter, the processor is configured to stitch the first aligned image and the second aligned image.

In an embodiment, the present disclosure discloses a non-transitory computer readable medium including instructions stored thereon that when processed by at least one processor cause an Electronic Control Unit (ECU) for stitching images captured by a vehicle. The ECU comprises a processor and a memory. The instructions causes the ECU to receive a first image comprising a first portion of a scene, from a first image capturing unit installed in the vehicle and a second image comprising a second portion of the scene, from a second image capturing unit installed in the vehicle. Further, the instructions cause the ECU to segment the first image and the second image based on one or more characteristics of a plurality of pixels of the first image and the second image. Further, the instructions cause the ECU to identify one or more groups of pixels from the plurality of pixels in each of the first image and the second image having similar characteristics from the one or more characteristic. The identified one or more groups of pixels form one or more clusters, wherein a centroid is determined for each of the one or more clusters a predetermined portion of overlap. Further, the instructions cause the ECU to generate a confidence score for the first image and the second image based on the centroid of each of the one or more clusters. Furthermore, the instructions cause the ECU to compute a difference in the confidence score of the first image and the second image. Moreover, the instructions cause the ECU to align the first image capturing unit and the second image capturing unit based on the difference in the confidence score. At least one of, the aligned first image capturing unit and the aligned second image capturing unit captures at least one of, a first aligned image and a second aligned image respectively. Thereafter, the instructions cause the ECU to stitch the first aligned image and the second aligned image.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The novel features and characteristics of the disclosure are set forth in the appended claims. The disclosure itself, however, as well as a preferred mode of use, further objectives and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which:

FIG. 1B shows a first image and a second image captured by a vehicle, in accordance with some embodiments of the present disclosure;

Figure 1A:
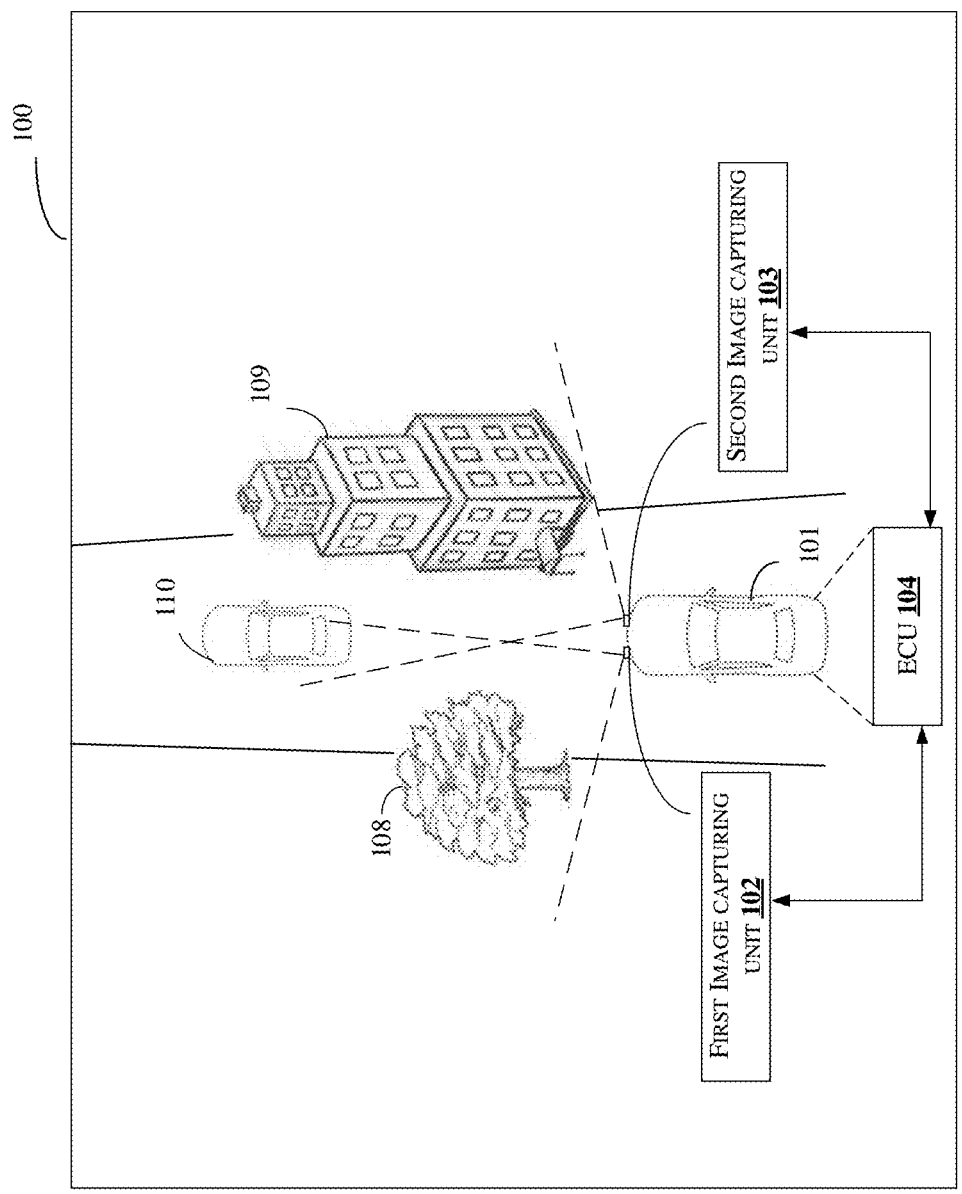
FIG. 1A shows an exemplary illustration showing a vehicle capturing images, in accordance with some embodiments of the present disclosure.

It should be appreciated by those skilled in the art that any block diagram herein represents conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternatives falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

Embodiments of the present disclosure relate to stitching images captured by a first capturing unit and a second capturing unit of a vehicle. A first image and a second image are captured respectively by the first capturing unit and the second capturing unit. A small amount of overlap may be present in the first image and second image. Further, the first image and the second image are segmented based on characteristics of pixels in respective images and clusters are determined based on the segments. Thereafter, a centroid is identified for each cluster and confidence score is determined using the centroids for each image. When the difference between the confidence score is less than a threshold value, the images are considered to be aligned and are stitched together. When difference is above the threshold value, the images are considered to be misaligned and cameras are aligned accordingly to correct the misalignment. Further, the images captured after aligning the cameras are stitched together. Therefore, images are stitched using less number of cameras compared to conventional systems.

FIG. 1A shows an exemplary scene (100). The scene (100) may be a view of image capturing units installed on a vehicle (101). For example, for image capturing units installed on a front side of the vehicle (101), the scene (100) may be the view ahead of the vehicle (101). Likewise, for image capturing units installed on a right side of the vehicle (101), the scene (100) may be the view to the right of the vehicle (101). In an embodiment, the scene (100) may comprise various objects like tree (108), building (109), and other vehicles (car 110). The vehicle (101) may be a car, a truck, a bus, and the like. Further, the vehicle (101) may be an autonomous vehicle or a self-driving vehicle. The vehicle (101) may comprise a first image capturing unit (102), a second image capturing unit (103), and an Electronic Control Unit (ECU) (104). The present disclosure has been described considering only two image capturing units. This should not be considered as a limitation and the present disclosure is applicable for a plurality of image capturing units as well. The first image capturing unit (102) and the second image capturing unit (103) may be placed in the front side of the vehicle (101). Further, a pair of image capturing units may be placed each on rear side of the vehicle (101), right side of the vehicle (101) and the left side of the vehicle (101) to capture images of the scene (100) around the vehicle (101) (image capturing units installed on right, left and rear side of the vehicle (101) are not shown in FIG. 1 and are obvious to a person skilled in the art). The image capturing units (102, 103) may be a camera. A person skilled in art may appreciate that other kinds of image capturing unit may be used (e.g., thermal cameras, IR cameras, etc). The image capturing units (102, 103) may be configured to capture images of respective views as represented by dotted lines in the FIG. 1A.

The ECU (104) may receive the images from the first image capturing unit (102) and the second image capturing unit (103) and determine a misalignment between the images. When the images are aligned, the images are stitched together. When the images are misaligned, an amount of misalignment is determined and the at least one of the first image capturing unit (102) and the second image capturing unit (103) are adjusted such that the images captured by the first and the second image capturing units (102, 103) are aligned. Finally, the ECU (104) may stitch the aligned images.

As shown in FIG. 1B, the first image capturing unit (102) may capture a first image (105) comprising a first portion of the scene (100). The first portion of the scene comprises a portion of the tree (108), and a portion of the car (110). The second image capturing unit (103) may capture a second image (106) comprising a second portion of the scene (100). The second portion of the scene comprises a portion of the building (109) and the car (110). The first image capturing unit (102) may capture the first portion of the scene (100) based on a field of view of the first image capturing unit (102). The second image capturing unit (103) may capture the second portion of the scene (100) based on a field of view of the second image capturing unit (103). In an embodiment, a predefined amount of overlap (107) may be present between the first image (105) and the second image (106). The predetermined portion of the overlap (107) may be used to determine an alignment between the first image (105) and the second image (106). As shown in FIG. 1B, the predetermined portion of the overlap may comprise the car (110)

Figure 2:
FIG. 2 shows an internal architecture of an ECU for stitching images captured by a vehicle, in accordance with some embodiments of the present disclosure.

FIG. 2 illustrates internal architecture of the ECU (104) in accordance with some embodiments of the present disclosure. The ECU (104) may include at least one Central Processing Unit ("CPU" or "processor") (203) and a memory (202) storing instructions executable by the at least one processor (203). The processor (203) may comprise at least one data processor for executing program components for executing user or system-generated requests. The memory (202) is communicatively coupled to the processor (203). The ECU (104) further comprises an Input/Output (I/O) interface (201). The I/O interface (201) is coupled with the processor (203) through which an input signal or/and an output signal is communicated.

In an embodiment, data (204) may be stored within the memory (202). The data (204) may include, for example, input data (205), segmentation data (206), cluster data (207), confidence score computation data (208), alignment data (209) and other data (210).

In an embodiment, the input data (205) may comprise the first image (105) and the second image (106).

In an embodiment, the segmentation data (206) may comprise data related to segmentation of the first image (105) and the second image (106). The segmentation data (206) may comprise one or more characteristics of a plurality of pixels of the first image (105) and the second image (106). The one or more characteristics of the plurality of pixels may comprise at least one of, a gray scale level of a plurality of pixels, a power spectrum of the first image (105) and the second image (106), a texture of the objects in the first image (105) and the second image (106), a shape of objects in the first image (105) and the second image (106), an intensity of the plurality of pixels, and a spatial location of the objects, and a color of the plurality of pixels.

In an embodiment, the cluster data (207) may comprise data related to formation of the one or more clusters in the first image (105) and the second image (106). The cluster data (207) may comprise the one or more characteristics of the pixels of the first image (105) and the second image (106) required to identify one or more groups of pixels having similar characteristics from the plurality of pixels in each of the first image (105) and the second image (106). The cluster data (207) may comprise the similar characteristics in the plurality of pixels, a class of objects in the first image (105) and the second image (106) and a relative distance between the one or more pixels.

In an embodiment, the confidence score computation data (208) may comprise data related to the centroids in the one or more clusters and a distance of a pair of centroids from respective centroids in the first image (105) and the second image (106). The confidence score computation data (208) may further comprise the confidence score of the first image (105) and the second image (106). Further, the confidence score computation data (208) may comprise a difference in the confidence score of the first image (105) and the second image (106).

In an embodiment, the alignment data (209) may comprise data related to the alignment of the first image capturing unit (102) and the second image capturing unit (103). The first and the second images (105 and 106) may be aligned by adjusting at least one of, the first image capturing unit (102) and the second image capturing unit (103) based on the difference in the computation score. The misalignment between the first and the second images (105 and 106) may be transformed into a movement required in the first and the second image capturing units (102 and 103). For example, an amount of misalignment of the first image (105) with respect to the second image (106) may be 1 cm in a x direction, considering an x-y plane. A corresponding movement of the first image capturing unit (102) may be 2 radians in an x rotational plane considering a x-y rotational plane. The alignment data (209) may be data related to the transformation of the misalignments into the movement in the first and the second image capturing units (102 and 103).

In an embodiment, the other data (210) may comprise data related to the stitching of the images captured by the vehicle (101). The data related to the stitching of the images may be the plurality of pixels of the first image (105) and the plurality of the pixels of the second image (106) in the predetermined portion of overlap (107). The data related to the stitching may comprise matrices representing the first image (105) and the second image (106). Further, the data may include, matrix values required for stitching.

In an embodiment, the data (204) in the memory (202) may be processed by modules (211) of the ECU (104). As used herein, the term modules (211) refers to an Application Specific Integrated Circuit (ASIC), an electronic circuit, a Field-Programmable Gate Arrays (FPGA), Programmable System-on-Chip (PSoC), a combinational logic circuit, and/or other suitable components that provide the described functionality. The modules (211) when configured with the functionality defined in the present disclosure will result in a novel hardware.

In one implementation, the modules (211) may include, for example, an input module (212), a segmentation module (213), a clustering module (214), a confidence score computation module (215), the decision engine (216), the orientation module (217), and other modules (218). It will be appreciated that such aforementioned modules (211) may be represented as a single module or a combination of different modules.

In an embodiment, the input module (212) may receive the first image (105) and the second image (106). The input module (212) may receive the first image (105) and the second image (106) from the first image capturing unit (102) and the second image capturing unit (103) respectively. In an embodiment, the first image (105) and the second image (106) are received in real-time. The input module (212) may pre-process the first and the second images (105 and 106). Pre-processing may include, but not limited to, removing noise, normalizing images, converting the images into matrices, and the like.

In an embodiment, the segmentation module (213) may segment the first image (105) and the second image (106) based on the one or more characteristics of the plurality of pixels. The segmentation module may, for example, segment the first image (105) and the second image (106) based on the edges in the first image (105) and the second image (106). For example, an image may be having three objects. The three objects may be segmented based on edge detection techniques. The edge detection techniques may comprise finding gradient of pixels in the image to detect the edges and thereby detect the object in the image. In an embodiment, the segmentation may be a semantic segmentation where the objects are detected based on a label assigned to each pixel of the image. The pixels having the same labels are grouped, thereby segmenting the image. Further, the pixels having the same labels may be color-coded. In an embodiment, artificial neural networks may be used for classification based on the labels. A person skilled in art will appreciate that any segmentation techniques can be used to perform segmentation.

In an embodiment, the clustering module (214) may identify the one or more groups of pixels from the plurality of pixels in each of the first image (105) and the second image (106) having similar characteristics from the one or more characteristics. The one or more clusters are identified in the predetermined portion of overlap (107). For example, a traffic pole in an image may have certain characteristics. The pixels of the traffic pole may be very close to each other compared to a distance of the pixels of the traffic pole from pixels of other objects in the image. By use of distancing, a group of pixels are formed and the group of pixels of a first object is differentiated from a second object. In another example, the traffic pole may be clustered based on the labels of individual pixels. The clustering module (214) may determine a centroid for each of the one or more clusters. For example, a K-means clustering technique may be used. A person skilled in art will appreciate that any clustering techniques can be used.

In an embodiment, the confidence score computation module (215) may compute the confidence score of the first image (105) and the second image (106) based on the centroids of the one or more clusters. The confidence score of the first image (105) and the second image (106) may be output of the Bayesian conditional probability. The Bayesian conditional probability may be a probabilistic distance of each centroid from other centroids in respective images (105, 106). The distance from a first centroid to a second centroid may be determined given that a third centroid is present in an image. Further, the confidence score computation unit (215) may compute a difference in the confidence score of the first image (105) and the second image (106).

In an embodiment, the decision engine (216) may determine the alignment of at least one of, the first image capturing unit (102) and the second image capturing unit (103). The decision engine (216) may receive the difference in the confidence score of the first image (105) and the second image (106) from the confidence score computation unit (215). The decision engine (216) may determine if the difference in the confidence score is less than a predetermined threshold. When the first image (105) and the second image (106) are misaligned, the distance of the centroids from other centroids in the first image (105) and the distance of the centroids from other centroids in the second image (106) varies in respective images, since the relative position of centroids may change. The confidence score which is the output of Bayesian conditional probability may reduce for the image which is misaligned. Hence, the difference in the confidence score of the first image (105) and the second image (106) may increase, indicating a reduction in overlap region. When the difference in the confidence score is greater than the predetermined threshold, the decision engine (216) may communicate the alignment data (209) to the orientation module (217) to align at least one of, the first image capturing unit (102) and the second image capturing unit (103).

In an embodiment, the orientation module (217) may receive the alignment data (209) from the decision engine (216). The orientation module (217) may align at least one of, the first image capturing unit (102) and the second image capturing unit (103) when the difference in the confidence score is greater than the predetermined threshold. The orientation module (217) may align at least one of, the first image capturing unit (102) and the second image capturing unit (103) based on the amount of misalignment between the first and the second images (105 and 106). The orientation module (217) may align the first image capturing unit (102) to capture the aligned first image with respect to the second image (106). The orientation module (217) may align the second image capturing unit (103) to capture the aligned second image with respect to the first image (105). The orientation module (217) may align both the first image capturing unit (102) and the second image capturing unit (103) to reduce the difference in the confidence score.

In an embodiment, the other modules (218) may comprise a stitching module. The stitching module may stitch the images captured by the vehicle (101). The stitching module may perform matrix addition by adding the plurality of pixels of the second image (106) to the plurality of the pixels of the first image (105). A person skilled in art will appreciate that stitching techniques other than matrix addition can also be used.

Figure 3:
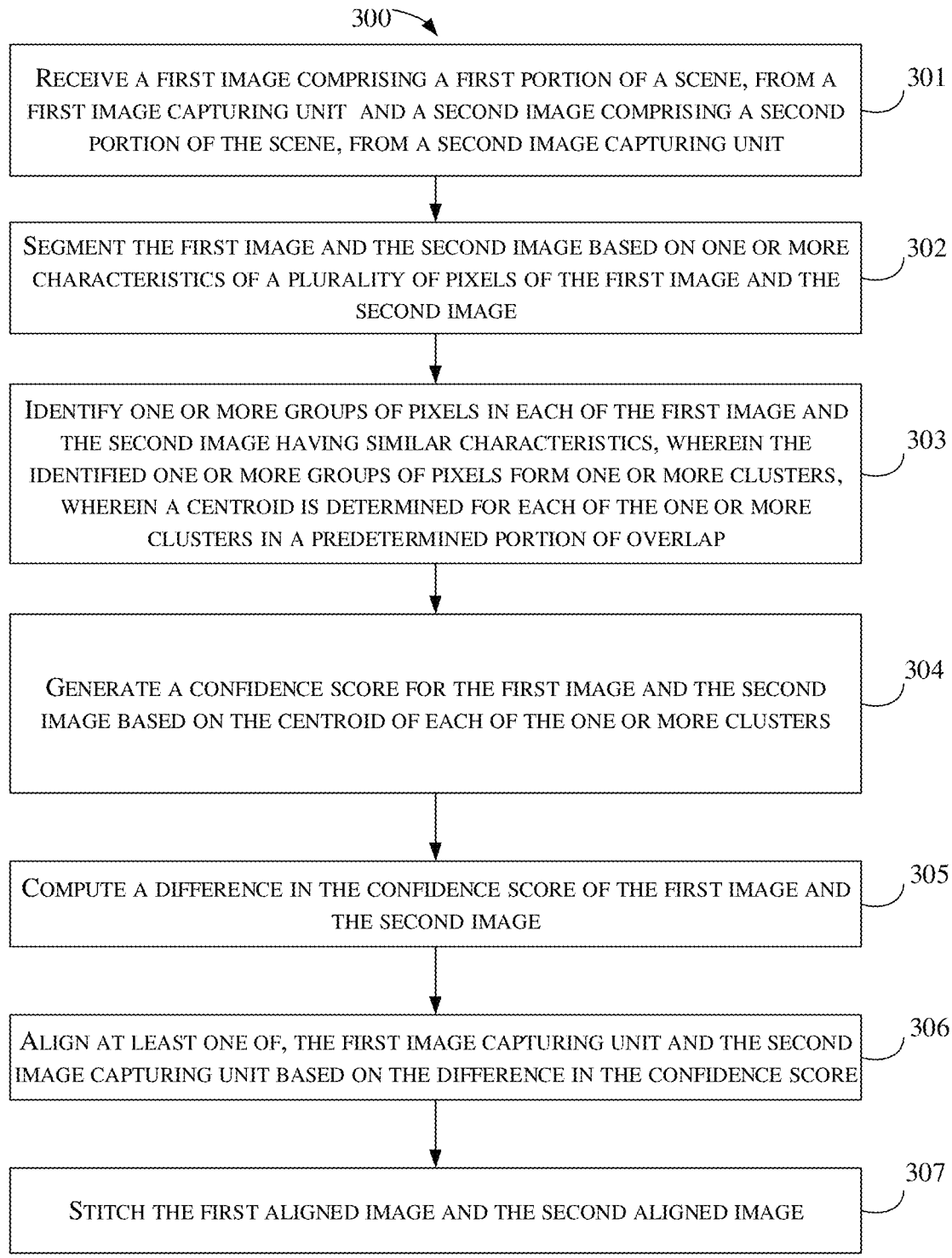
FIG. 3 shows an exemplary flow chart illustrating method steps for stitching of images captured by a vehicle, in accordance with some embodiments of the present disclosure.

FIG. 3 shows a flow chart illustrating a method to stitch the images captured by the vehicle (101), in accordance with some embodiments of the present disclosure. As illustrated in FIG. 3, the method (300) may comprise one or more steps. The method (300) may be described in the general context of computer executable instructions. Generally, computer executable instructions can include routines, programs, objects, components, data structures, procedures, modules, and functions, which perform particular functions or implement particular abstract data types.

The order in which the method (300) is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

Figure 4A:
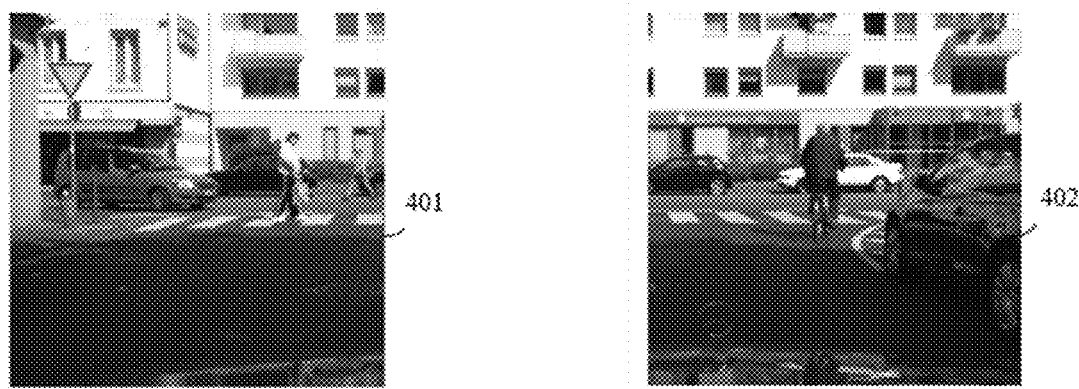
FIG. 4A-4E are exemplary illustrations of images during the process of stitching, in accordance with some embodiments of the present disclosure.

At step (301), receiving, by the ECU (104), the first image (105) comprising the first portion of the scene (100), from the first image capturing unit (102) installed in the vehicle (101) and the second image (106) comprising the second portion of the scene (100), from the second image capturing unit (103) installed in the vehicle (101). The first image capturing unit (102) may capture the first portion of the scene (100) based on the first field of view of the first image capturing unit (102). The second image capturing unit (103) may capture the second portion of the scene (100) based on the second field of view of the second image capturing unit (103). The first image (105) and the second image (106) may have the predetermined portion of overlap (107). Referring to example of FIG. 4A, the ECU (104) receives a first image (401) comprising a first portion of a scene and a second image (402) comprising a second image (402) of the scene.

Figure 4B:
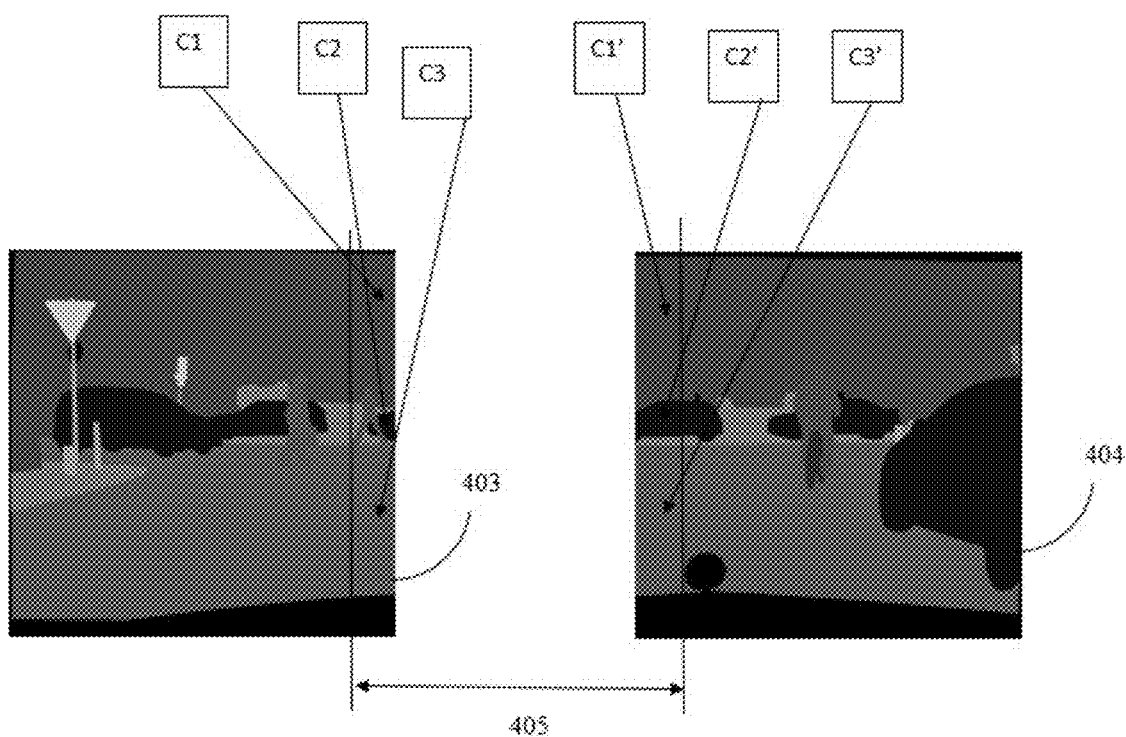

Referring back to FIG. 3, at step (302), segmenting, by the ECU (104), the first image (105) and the second image (106) based on the one or more characteristics of the plurality of pixels. The ECU (104) may segment the first image (105) and the second image (106) based on the one or more characteristics of the pixels of the first image (105) and the second image (106). The one or more characteristics may comprise the gray scale level of a plurality of pixels. For example, the segmentation may be performed using conventional edge detection techniques. Objects in the image may be identified once the edges are identified. Referring to FIG. 4B, the ECU (104) may segment the first image (401) and the second image (402) using semantic segmentation to provide segmented first image (403) and segmented second image (404). A person skilled in art will appreciate that any segmentation techniques can be used to perform the segmentation of an image. In the semantic segmentation each pixel in an image is assigned a class label. The present disclosure has been described considering the color segmentation. The pixels may be color coded based on different classes. In the segmented first image (403) and the segmented second image (404), building is color coded in gray color, four wheel vehicles are color coded in blue color, road is color coded in purple color, people are color coded in red color, street is color coded in pink color, and signals are coded in yellow color.

Referring back to FIG. 3, at step (303), identifying, by the ECU (104), the one or more groups of pixels from the plurality of pixels in each of the first image (105) and the second image (106) having similar characteristics from the one or more characteristics. The identified one or more groups of pixels may form the one or more clusters and a centroid may be determined for each of the one or more clusters in the predetermined portion of overlap (107). The ECU (104) may identify the one or more groups of the pixels in the first image (105) and the second image (106) having the similar characteristics to form the one or more clusters in the predetermined portion of overlap (107). In an embodiment, the predetermined portion of overlap (107) may be at most 10% of an overlapping end of the first image (105) and at most 10% of the overlapping end of the second image (106). The one or more clusters may be formed based on at least one of, the similar characteristics in the plurality of pixels, a class of objects in the first image (105) and the second image (106) and a relative distance between the one or more pixels. For example, pixels of a first object in an image may be close to each other compared to other pixels in the image. A centroid may be assigned to each of the one or more clusters. For example, consider there are three clusters in the predetermined portion of overlap (107). The K-means clustering technique may use several iterations to determine the centroids. In a first iteration, a distance between a pixel and the centroid may be determined randomly. In further iterations, the distance is minimised by identifying shortest distance between the pixel and the centroid. A person skilled in the art will appreciate that any clustering techniques may be used. Referring to the FIG. 4B, the centroids are determined in the predetermined portion of overlap (405). C1 is the centroid of the building (gray segmented color) in the segmented first image (403). C2 is the centroid of a car (blue segmented color) in the segmented first image (403). C3 is the centroid of the road (purple segmented color) in the segmented first image (403). C1' is the centroid of the building (gray segmented color) in the segmented second image (404). C2' is the centroid of the car (blue segmented color) in the segmented second image (404). C3' is the centroid of the road (purple segmented color) segmented second image (404).

Referring back to FIG. 3, at step (304), generating, by the ECU (104), the confidence score for the first image (105) and the second image (106) based on the centroid of each of the one or more clusters. The confidence score of the first image (105) The confidence score of the first image (105) and the second image (106) may be the output of the Bayesian conditional probability. The Bayesian conditional probability may be a probabilistic distance of each centroid from respective centroids in the second image (105). For example, the Bayesian conditional probability may be a probability of a distance between a first centroid and a second centroid given third centroid is present in the image. The confidence score is generated based on an equation (1)

$$\text{Confidence score of each image} = \frac{\sum \text{Bayesian Conditional Probability}}{\text{Total number of centroids}}$$

$$= \frac{P(d12\mid C3) + P(d23\mid C1) + P(d31\mid C2)}{3}$$

where, P(d12|C3) represents the distance between centroid 1 and centroid 2, given centroid 3 present in the image, P(d23|C1) represents the distance between centroid 2 and centroid 3, given centroid 1 present in the image, and P(d31|C2) represents the distance between centroid 3 and centroid 1, given centroid 2 present in the image.

Here, the equation (1) is given considering three centroids. The equation (1) may be extended to N centroids. Referring to the FIG. 3B, the confidence score for the segmented first image (403) may be generated as (0.82+0.75+0.90)/3=0.82 (for example). The confidence score for the segmented second image (404) may be generated as (0.82+0.78+0.90)/3=0.83 (for example).

Referring back to FIG. 3, at step (305), computing, by the ECU (104), the difference in the confidence score of the first image (105) and the second image (106). The ECU (104) may determine the difference in the confidence score to determine the alignment of the first image (105) and the second image (106). When the first image (105) and the second image (106) are misaligned, the distance of the centroids from other centroids in the first image (105) and the distance of the centroids from other centroids in the second image (106) varies in respective images, since the relative position of centroids may change. The confidence score which is the output of Bayesian conditional probability may reduce for the image which is misaligned. Hence, the difference in the confidence score of the first image (105) and the second image (106) may increase, indicating a reduction in overlap region. Referring to the FIG. 4B and referring to paragraph 42, the confidence score of the segmented first image (403) may be 0.82 and the confidence score of the segmented second image (404) may be 0.83. The difference in the confidence score is 0.01. The difference in the confidence score may be computed by the ECU (104) to determine the alignment of the segmented first image (403) and the segmented second image (404).

Figure 4C:
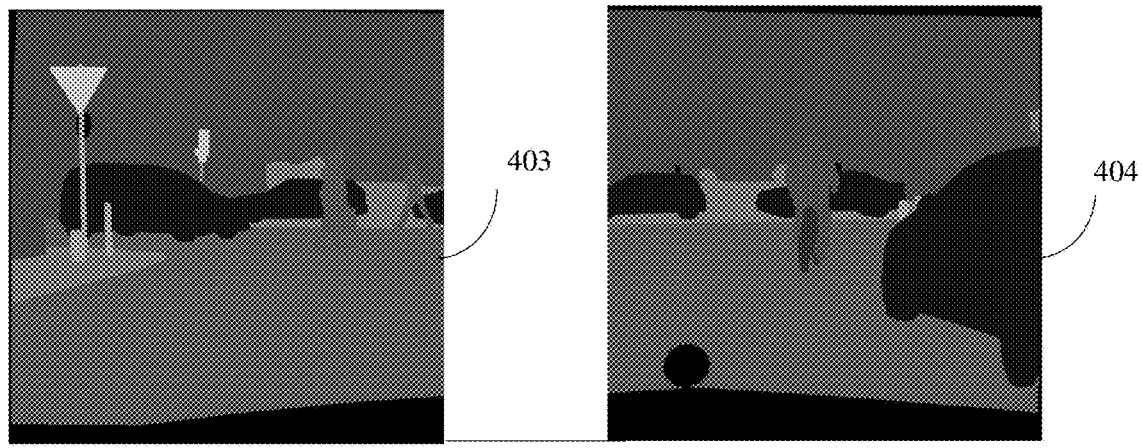
Figure 4D:
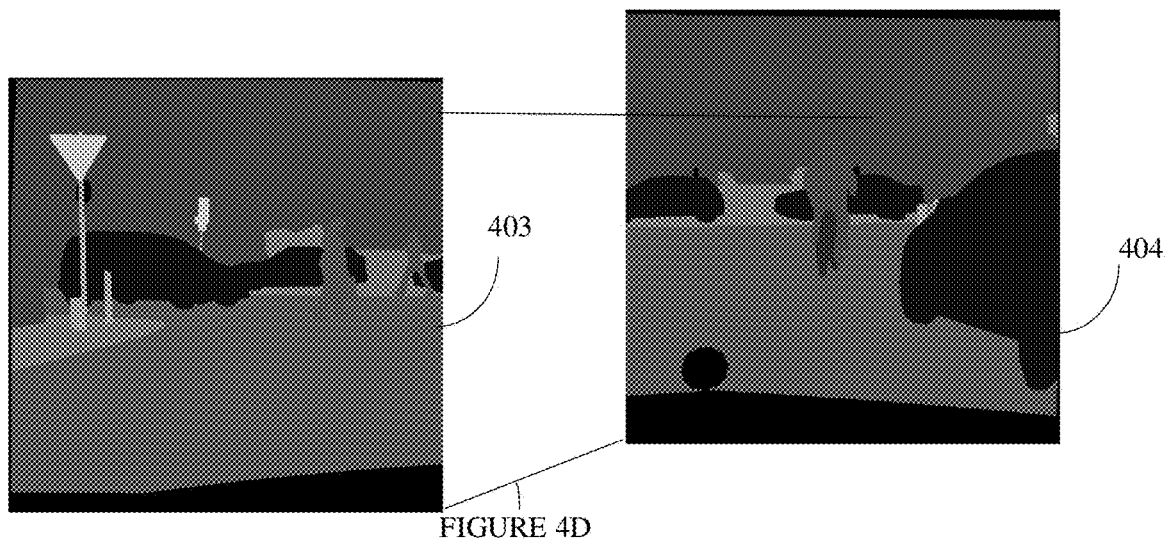

Referring back to FIG. 3, at step (306), aligning, by the ECU (104), at least one of, the first image capturing unit (102) and the second image capturing unit (103) based on the difference in the confidence score, wherein at least one of, the aligned first image capturing unit (102) and the aligned second image capturing unit (103) captures at least one of, a first aligned image and a second aligned image respectively. The ECU (104) may align at least one of, the first image capturing unit (102) and the second image capturing unit (103) when the difference in the confidence score is greater than the predetermined threshold. The camera ECU (104) may align the first image capturing unit (102) to capture the aligned first image with respect to the second image (106). The ECU (104) may align the second image capturing unit (103) to capture the aligned second image with respect to the first image (105). The ECU (104) may align both the first image capturing unit (102) and the second image capturing unit (103) to reduce the difference in the confidence score. The misalignment between the first and the second images (105 and 106) may be transformed into a movement required in the first and the second image capturing units (102 and 103). For example, an amount of misalignment of the first image (105) with respect to the second image (106) may be 1 cm in a x direction, considering an x-y plane. A corresponding movement of the first image capturing unit (102) may be 2 radians in an x rotational plane considering a x-y rotational plane. The ECU (104) may align the first image capturing unit (102) based on the amount of misalignment. Referring to paragraph 43, the difference in the confidence score is 0.01. The predetermined threshold may be 0.25. The difference in the confidence score is less than the predetermined threshold. Hence, the alignment of the first image capturing unit (102) and the second image capturing unit (103) may not be needed. FIG. 4C shows a scenario where the segmented first image (403) and the segmented second image (404) are aligned. FIG. 4D shows a scenario where the segmented first image (403) and the segmented second image (404) are misaligned. The difference in the confidence score may be high, when the segmented first image (403) and the segmented second image (404) are misaligned. For example, a focus of the second image capturing unit (103) may be different from a focus of the first image capturing unit (102). A relative position of the centroid of the road with respect to other centroids in the segmented second image (404) may be different from the position of the centroid of the road with respect to other centroids in the segmented first image (403). Hence, the difference in the confidence score may increase, indicating the misalignment. The ECU (104) may align the second image capturing unit (103) to capture the second aligned image until the segmented first image (403) and the second aligned image are in a same horizontal level.

Figure 4E:

Referring back to FIG. 3, at step (307), stitching, by the ECU (104), the first aligned image and the second aligned image. The ECU (104) may stitch the first image (105) and the second image (106) once the first image (105) and the second image (106) are aligned. The ECU (104) may perform matrix addition by adding the plurality of pixels of the second image (106) to the plurality of the pixels of the first image (105). A person skilled in art will appreciate that stitching techniques other than matrix addition can also be used. FIG. 4E shows stitched image. The segmented first image (403) and the segmented second image (404) are stitched to form the stitched image.

Computer System

Figure 5:
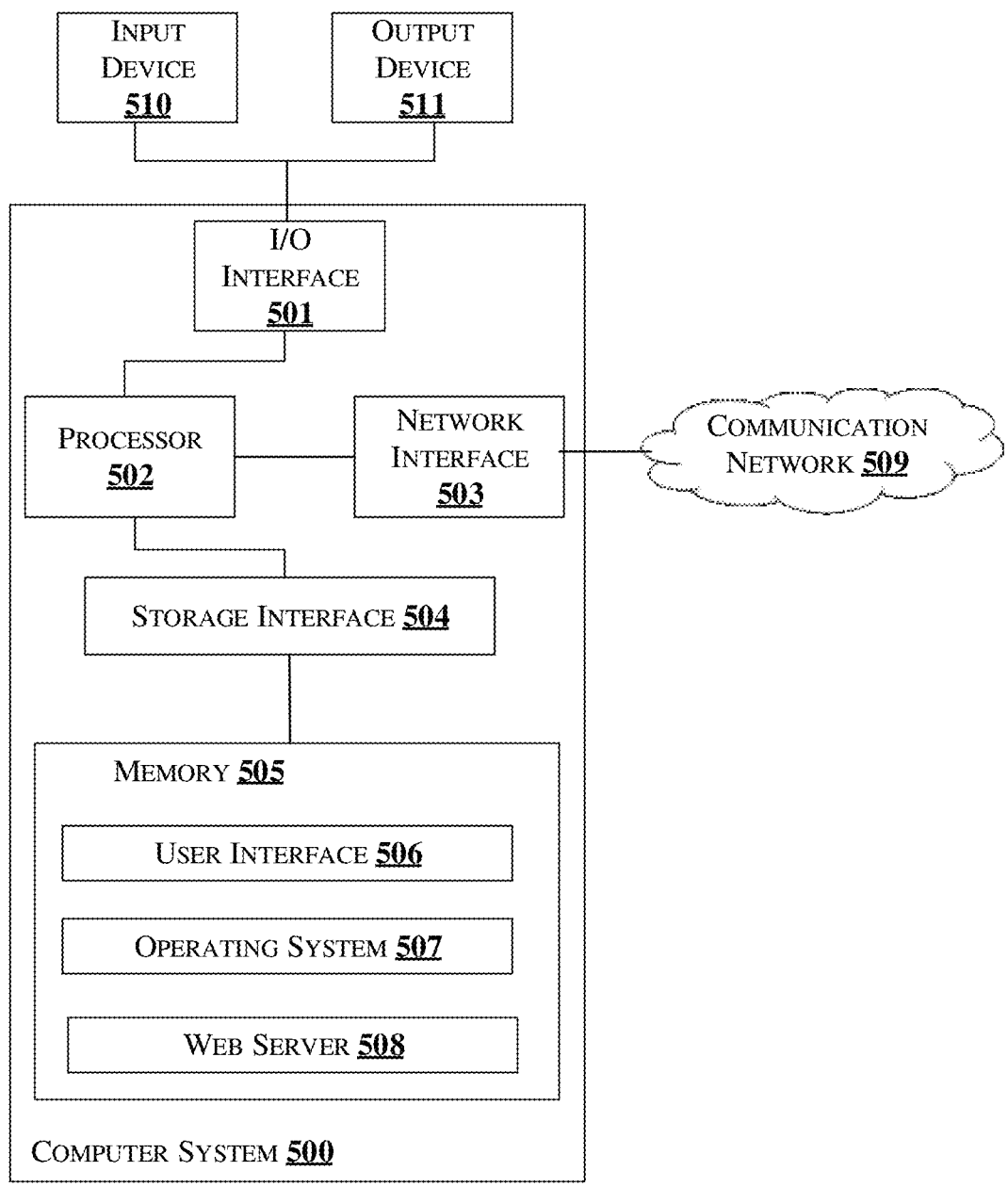
FIG. 5 shows a block diagram of a general-purpose computer system for stitching of images captured by a vehicle, in accordance with embodiments of the present disclosure.

FIG. 5 illustrates a block diagram of an exemplary computer system (500) for implementing embodiments consistent with the present disclosure. In an embodiment, the computer system (500) is used stitching images captured by a vehicle. The computer system (500) may comprise a central processing unit ("CPU" or "processor") (502). The processor (502) may comprise at least one data processor. The processor (502) may include specialized processing units such as integrated system (bus) controllers, memory management control units, floating point units, graphics processing units, digital signal processing units, etc.

The processor (502) may be disposed in communication with one or more input/output (I/O) devices (not shown) via I/O interface (501). The I/O interface (501) may employ communication protocols/methods such as, without limitation, audio, analog, digital, monoaural, RCA, stereo, The Institute of Electrical and Electronics Engineers (IEEE®-1394), serial bus, universal serial bus (USB), infrared, PS/2, BNC, coaxial, component, composite, digital visual interface (DVI), high-definition multimedia interface (HDMI), RF antennas, S-Video, VGA, IEEE® 802.n/b/g/n/x, Bluetooth®, cellular (e.g., code-division multiple access (CDMA), high-speed packet access (HSPA+), global system for mobile communications (GSM), long-term evolution (LTE™), WiMax®, or the like), etc.

Using the I/O interface (501), the computer system (500) may communicate with one or more I/O devices. For example, the input device (510) may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device (511) may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

The processor (502) may be disposed in communication with the communication network (509) via a network interface (503). The network interface (503) may communicate with the communication network (509). The network interface (503) may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network (509) may include, without limitation, a direct interconnection, local area network (LAN), wide area network (WAN), wireless network (e.g., using Wireless Application Protocol), the Internet, etc. The network interface (503) may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network (509) includes, but is not limited to, a direct interconnection, an e-commerce network, a peer to peer (P2P) network, local area network (LAN), wide area network (WAN), wireless network (e.g., using Wireless Application Protocol), the Internet, Wi-Fi and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor (502) may be disposed in communication with a memory (505) (e.g., RAM, ROM, etc. not shown in FIG. 5) via a storage interface (504). The storage interface (504) may connect to memory (505) including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory (505) may store a collection of program or database components, including, without limitation, user interface (506), an operating system (507), web server (508) etc. In some embodiments, computer system (500) may store user/application data, such as, the data, variables, records, etc., as described in this disclosure. Such databases may be implemented as fault-tolerant, relational, scalable, secure databases such as Oracle® or Sybase®.

The operating system (507) may facilitate resource management and operation of the computer system (500). Examples of operating systems include, without limitation, APPLE® MACINTOSH® OS X, UNIX®, UNIX® like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLE® IOS™, GOOGLE® ANDROID™, BLACKBERRY®OS, or the like.

In some embodiments, the computer system (500) may implement a web browser (508) stored program component. The web browser (508) may be a hypertext viewing application, for example MICROSOFT® INTERNET® EXPLORER™ GOOGLE® CHROME™, MOZILLA® FIREFOX™, APPLE® SAFARI™, etc. Secure web browsing may be provided using Secure Hypertext Transport Protocol (HTTPS), Secure Sockets Layer (SSL), Transport Layer Security (TLS), etc. Web browsers (508) may utilize facilities such as AJAX™, DHTML™, ADOBE® FLASH™, JAVASCRIPT™, JAVA™, Application Programming Interfaces (APIs), etc. In some embodiments, the computer system (500) may implement a mail server (not shown in Figure) stored program component. The mail server may be an Internet mail server such as Microsoft® Exchange®, or the like. The mail server may utilize facilities such as ASP™, ACTIVEX™, ANSI™ C++/C#, MICROSOFT®, .NET™, CGI SCRIPTS™, JAVA™, JAVASCRIPT™, PERL™, PHP™, PYTHON™, WEBOBJECTS™, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system (500) may implement a mail client stored program component. The mail client (not shown in Figure) may be a mail viewing application, such as APPLE® MAIL™, MICROSOFT® ENTOURAGE™, MICROSOFT® OUTLOOK™, MOZILLA® THUNDERBIRD™, etc.

In traditional systems, method for stitching images is not efficient as there are multiple cameras used to obtain a 360° field of view and there are multiple overlaps within images. The present disclosure for stitching the images tries to overcome the technical problem of the traditional systems. The present disclosure provides a method for stitching the images with a minimal predetermined portion of overlap. Further, the present disclosure provides a method to stitch the images only after ensuring the images are aligned. Further number of image capturing units is reduced in comparison with the traditional systems which needed more image capturing units due to high amount of overlap. The present disclosure helps in reducing the space and the cost in installing the image capturing units.

In light of the above mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 3 shows certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method of stitching images captured by a vehicle, comprising:
    receiving, by an Electronic Control Unit (ECU) of the vehicle, a first image comprising a first portion of a scene, from a first image capturing unit installed in the vehicle and a second image comprising a second portion of the scene, from a second image capturing unit installed in the vehicle;
    segmenting, by the ECU, the first image and the second image based on one or more characteristics of a plurality of pixels of the first image and the second image, wherein the one or more characteristics comprises at least one of a gray scale level of a plurality of pixels, a power spectrum of the first image and the second image, a texture of objects in the first image and the second image, a shape of the objects in the first image and the second image, an intensity of the plurality of pixels, a spatial location of the objects, and a color of the plurality of pixels;
    identifying, by the ECU, one or more groups of pixels from the plurality of pixels in each of the first image and the second image having similar characteristics from the one or more characteristics, wherein the one or more groups of pixels having similar characteristics indicate pixels that have at least one of the one or more characteristics equivalent to each other, wherein the identified one or more groups of pixels form one or more clusters, wherein a centroid is determined for each of the one or more clusters in a predetermined portion of overlap, wherein the predetermined portion of overlap indicates a percentage of an overlapping end of the first image and an overlapping end of the second image;
    generating, by the ECU, a confidence score for the first image and the second image based on the centroid of each of the one or more clusters;
    computing, by the ECU, a difference in the confidence score of the first image and the second image;
    aligning, by the ECU, at least one of, the first image capturing unit and the second image capturing unit based on the difference in the confidence score, wherein at least one of, the aligned first image capturing unit and the aligned second image capturing unit captures at least one of, a first aligned image and a second aligned image respectively; and
    stitching, by the ECU, the first aligned image and the second aligned image, wherein stitching the first aligned image and the second aligned image comprises matrix addition by adding the plurality of pixels of the second aligned image to the plurality of pixels of the first aligned image along an overlapping end of respective images.

2. The method of claim 1, wherein the segmentation of the first image and the second image is performed using Neural Networks.

3. The method of claim 1, wherein the one or more clusters are formed based on at least one of, the similar characteristics in the plurality of pixels, a class of objects in the first image and the second image and a distance between the one or more pixels, wherein the distance indicates that the one or more pixels are within a threshold distance of each other.

4. The method of claim 1, wherein the confidence score is determined using Bayesian Conditional Probability.

5. The method of claim 1, wherein aligning the first image capturing unit and the second image capturing unit comprises:
    determining, a pair of centroids in each of the first image and the second image;
    generating, the confidence score of the first image and the second image by determining a distance of the pair of centroids from respective centroids in the first image and the second image to determine a misalignment between the first image and the second image; and
    aligning at least one of, the first image capturing unit and the second image capturing unit based on the misalignment.

6. An Electronic Control Unit (ECU) of a vehicle, for stitching images captured by the vehicle, comprising:
    one or more processors; and
    a memory, wherein the memory stores processor-executable instructions, which, on execution, cause the one or more processors to:
    receive a first image comprising a first portion of a scene, from a first image capturing unit installed in the vehicle and a second image comprising a second portion of the scene, from a second image capturing unit installed in the vehicle;
    segment the first image and the second image based on one or more characteristics of a plurality of pixels of the first image and the second image, wherein the one or more characteristics comprises at least one of a gray scale level of a plurality of pixels, a power spectrum of the first image and the second image, a texture of objects in the first image and the second image, a shape of the objects in the first image and the second image, an intensity of the plurality of pixels, a spatial location of the objects, and a color of the plurality of pixels;

identify one or more groups of pixels from the plurality of pixels in each of the first image and the second image having similar characteristics from the one or more characteristics, wherein the one or more groups of pixels having similar characteristics indicate pixels that have at least one of the one or more characteristics equivalent to each other, wherein the identified one or more groups of pixels form one or more clusters, wherein a centroid is determined for each of the one or more clusters in a predetermined portion of overlap, wherein the predetermined portion of overlap indicates a percentage of an overlapping end of the first image and an overlapping end of the second image;

generate a confidence score for the first image and the second image based on the centroid of each of the one or more clusters;

compute a difference in the confidence score of the first image and the second image;

align the first image capturing unit and the second image capturing unit based on the difference in the confidence score, wherein at least one of, the aligned first image capturing unit and the aligned second image capturing unit captures at least one of, a first aligned image and a second aligned image respectively; and stitch the first aligned image and the second aligned image, wherein stitching the first aligned image and the second aligned image comprises matrix addition by adding the plurality of pixels of the second aligned image to the plurality of pixels of the first aligned image along an overlapping end of respective images.

7. The ECU of claim 6, wherein the one or more processors are configured to segment the first image and the second image using Neural Networks.

8. The ECU of claim 6, wherein the one or more clusters are formed based on at least one of, the similar characteristics in the plurality of pixels, a class of objects in the first image and the second image and a distance between the one or more pixels, wherein the distance indicates that the one or more pixels are within a threshold distance of each other.

9. The ECU of claim 6, wherein the one or more processors are configured to determine the confidence score using Bayesian Conditional Probability.

10. The ECU of claim 6, wherein the one or more processors are configured to align the first image capturing unit and the second image capturing unit by:

determining, a pair of centroids each in the first image and the second image;

generating, the confidence score of the first image and the second image by determining a distance of the pair of centroids from respective centroids in the first image and the second image to determine a misalignment between the first image and the second image; and aligning at least one of, the first image capturing unit and the second image capturing unit based on the misalignment.

11. A non-transitory computer readable medium including instructions stored thereon that when processed by at least one processor, wherein the instructions cause an Electronic Control Unit (ECU) to:

receive a first image comprising a first portion of a scene, from a first image capturing unit installed in the vehicle and a second image comprising a second portion of the scene, from a second image capturing unit installed in the vehicle;

segment the first image and the second image based on one or more characteristics of a plurality of pixels of the first image and the second image, wherein the one or more characteristics comprises at least one of a gray scale level of a plurality of pixels, a power spectrum of the first image and the second image, a texture of objects in the first image and the second image, a shape of the objects in the first image and the second image, an intensity of the plurality of pixels, a spatial location of the objects, and a color of the plurality of pixels;

identify one or more groups of pixels from the plurality of pixels in each of the first image and the second image having similar characteristics from the one or more characteristics, wherein the one or more groups of pixels having similar characteristics indicate pixels that have at least one of the one or more characteristics equivalent to each other, wherein the identified one or more groups of pixels form one or more clusters, wherein a centroid is determined for each of the one or more clusters in a predetermined portion of overlap, wherein the predetermined portion of overlap indicates a percentage of an overlapping end of the first image and an overlapping end of the second image;

generate a confidence score for the first image and the second image based on the centroid of each of the one or more clusters;

compute a difference in the confidence score of the first image and the second image;

align at least one of the first image capturing unit and the second image capturing unit based on the difference in the confidence score, wherein at least one of, the aligned first image capturing unit and the aligned second image capturing unit captures at least one of, a first aligned image and a second aligned image respectively; and stitch the first aligned image and the second aligned image, wherein stitching the first aligned image and the second aligned image comprises matrix addition by adding the plurality of pixels of the second aligned image to the plurality of pixels of the first aligned image along an overlapping end of respective images.

12. The non-transitory computer readable medium of claim 11, wherein the instructions cause the at least one processor to segment the first image and the second image using Neural Networks.

13. The non-transitory computer readable medium of claim 11, wherein the one or more clusters are formed based on at least one of, the similar characteristics in the plurality of pixels, a class of objects in the first image and the second image and a distance between the one or more pixels, wherein the distance indicates that the one or more pixels are within a threshold distance of each other.

14. The non-transitory computer readable medium of claim 11, wherein the instructions cause the at least one processor to determine the confidence score using Bayesian Conditional Probability.

15. The non-transitory computer readable medium of claim 11, wherein the instructions cause the at least one processor to align the first image capturing unit and the second image capturing unit by:

determining, a pair of centroids each in the first image and the second image;

generating, the confidence score of the first image and the second image by determining a distance of the pair of centroids from respective centroids in the first image and the second image to determine a misalignment between the first image and the second image; and aligning at least one of, the first image capturing unit and the second image capturing unit based on the misalignment.

* * * * *